United States Patent
Liu et al.

(10) Patent No.: US 7,530,736 B2
(45) Date of Patent: May 12, 2009

(54) PERFORMANCE TESTING APPARATUS FOR HEAT PIPES

(75) Inventors: Tay-Jian Liu, Tu-Cheng (TW); Chuen-Shu Hou, Tu-Cheng (TW); Chao-Nien Tung, Tu-Cheng (TW); Qian-Hua He, Shenzhen (CN)

(73) Assignee: Fu Zhun Precision Industry (Shen Zhen) Co., Ltd., Shenzhen City, Guangdong Province (CN)

( * ) Notice: Subject to any disclaimer, the term of this patent is extended or adjusted under 35 U.S.C. 154(b) by 235 days.

(21) Appl. No.: 11/309,289

(22) Filed: Jul. 21, 2006

(65) Prior Publication Data

US 2007/0165692 A1 Jul. 19, 2007

(30) Foreign Application Priority Data

Jan. 16, 2006 (CN) .................. 2006 1 0033106

(51) Int. Cl.
*G01K 25/00* (2006.01)
*G01K 1/16* (2006.01)

(52) U.S. Cl. .................. 374/44; 374/29; 374/137; 374/147; 374/208; 374/5; 374/57

(58) Field of Classification Search .......... 374/4, 374/5, 29–32, 43–44, 57, 137, 152, 147, 374/208, 179
See application file for complete search history.

(56) References Cited

U.S. PATENT DOCUMENTS

| | | | | |
|---|---|---|---|---|
| 3,142,983 A | * | 8/1964 | Dudley et al. .................. 374/29 |
| 4,826,327 A | * | 5/1989 | Michell .................. 374/20 |
| 5,101,888 A | * | 4/1992 | Sprouse et al. .......... 165/104.26 |
| 5,168,921 A | * | 12/1992 | Meyer, IV ............. 165/104.14 |
| 5,248,198 A | * | 9/1993 | Droege .................... 374/7 |
| 5,355,683 A | * | 10/1994 | Taylor .................. 62/51.1 |
| 5,409,055 A | * | 4/1995 | Tanaka et al. .......... 165/104.33 |
| 6,883,584 B2 | * | 4/2005 | Grober et al. ................. 164/476 |
| 7,147,368 B2 | * | 12/2006 | Chien .................. 374/147 |
| 7,304,848 B2 | * | 12/2007 | Chang .................. 361/701 |
| 2005/0274495 A1 | * | 12/2005 | Wang et al. ............ 165/104.26 |
| 2006/0216561 A1 | * | 9/2006 | Chien et al. .................. 429/26 |
| 2007/0006995 A1 | * | 1/2007 | Lin .................. 165/104.26 |

FOREIGN PATENT DOCUMENTS

TW M279851 11/2005

* cited by examiner

*Primary Examiner*—Gail Verbitsky
(74) *Attorney, Agent, or Firm*—Frank R. Niranjan (57) ABSTRACT

A performance testing apparatus for a heat pipe includes an immovable portion having a heating member located therein for heating a heat pipe requiring test. A movable portion is capable of moving relative to the immovable portion. A receiving structure is defined between the immovable portion and the movable portion for receiving the heat pipe therein. At least one temperature sensor is telescopically mounted in at least one of the immovable portion and the movable portion. The least one temperature sensor has a detecting section exposed in the receiving structure for thermally contacting the heat pipe in the receiving structure to detect a temperature of the heat pipe.

13 Claims, 7 Drawing Sheets

PERFORMANCE TESTING APPARATUS FOR HEAT PIPES

FIELD OF THE INVENTION

The present invention relates generally to testing apparatuses, and more particularly to a performance testing apparatus for heat pipes.

DESCRIPTION OF RELATED ART

It is well known that a heat pipe is generally a vacuum-sealed pipe. A porous wick structure is provided on an inner face of the pipe, and phase changeable working media employed to carry heat is included in the pipe. Generally, according to where the heat is input or output, a heat pipe has three sections, an evaporating section, a condensing section and an adiabatic section between the evaporating section and the condensing section.

In use, the heat pipe transfers heat from one place to another place mainly by exchanging heat through phase change of the working media. Generally, the working media is a liquid such as alcohol or water and so on. When the working media in the evaporating section of the heat pipe is heated up, it evaporates, and a pressure difference is thus produced between the evaporating section and the condensing section in the heat pipe. The resultant vapor with high enthalpy rushes to the condensing section and condenses there. Then the condensed liquid reflows to the evaporating section along the wick structure. This evaporating/condensing cycle continually transfers heat from the evaporating section to the condensing section. Due to the continual phase change of the working media, the evaporating section is kept at or near the same temperature as the condensing section of the heat pipe. Heat pipes are used widely owing to their great heat-transfer capability.

In order to ensure the effective working of the heat pipe, the heat pipe generally requires testing before being used. The maximum heat transfer capacity (Qmax) and the temperature difference ($\Delta T$) between the evaporating section and the condensing section are two important parameters in evaluating performance of the heat pipe. When a predetermined quantity of heat is input into the heat pipe through the evaporating section thereof, thermal resistance (Rth) of the heat pipe can be obtained from $\Delta T$, and the performance of the heat pipe can be evaluated. The relationship between these parameters Qmax, Rth and $\Delta T$ is Rth=$\Delta T$/Qmax. When the input quantity of heat exceeds the maximum heat transfer capacity (Qmax), the heat cannot be timely transferred from the evaporating section to the condensing section, and the temperature of the evaporating section increases rapidly.

A typical method for testing the performance of a heat pipe is to first insert the evaporating section of the heat pipe into a liquid at constant temperature; after a period of time the temperature of the heat pipe will become stable, then a temperature sensor such as a thermocouple, a resistance thermometer detector (RTD) or the like can be used to measure $\Delta T$ between the liquid and the condensing section of the heat pipe to evaluate the performance of the heat pipe. However, Rth and Qmax can not be obtained by this test, and the performance of the heat pipe can not be reflected exactly by this test.

Figure 5:
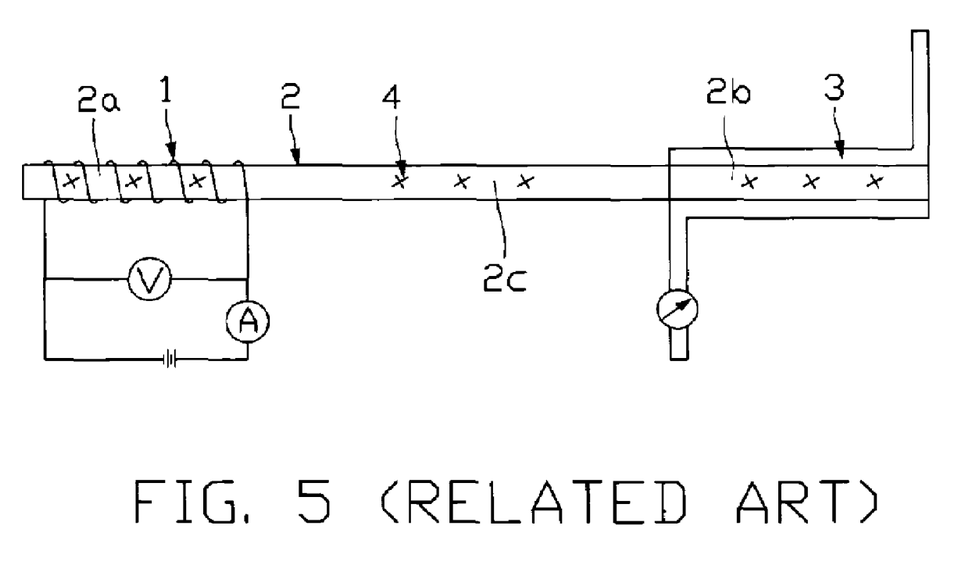
FIG. 5 is a performance testing apparatus for heat pipes in accordance with related art.

Referring to FIG. 5, a related performance testing apparatus for heat pipes is shown. The apparatus has a resistance wire 1 coiling round an evaporating section 2a of a heat pipe 2, and a water cooling sleeve 3 functioning as a heat sink and enclosing a condensing section 2b of the heat pipe 2. In use, electrical power controlled by a voltmeter and an ammeter flows through the resistance wire 1, whereby the resistance wire 1 heats the evaporating section 2a of the heat pipe 2. At the same time, by controlling flow rate and temperature of cooling liquid entering the cooling sleeve 3, the heat input at the evaporating section 2a can be removed from the heat pipe 2 by the cooling liquid at the condensing section 2b, whereby a stable operating temperature of adiabatic section 2c of the heat pipe 2 is obtained. Therefore, Qmax of the heat pipe 2 and $\Delta T$ between the evaporating section 2a and the condensing section 2b can be obtained by temperature sensors 4 at different positions on the heat pipe 2.

However, in the test, the related testing apparatus has the following drawbacks: a) it is difficult to accurately determine lengths of the evaporating section 2a and the condensing section 2b which are important factors in determining the performance of the heat pipe 2; b) heat transference and temperature measurement may easily be affected by environmental conditions; and, c) it is difficult to achieve sufficiently intimate contact between the heat pipe and the heat source and between the heat pipe and the heat sink, which results in uneven performance test results of the heat pipe. Furthermore, due to awkward and laborious assembly and disassembly in the test, the testing apparatus can be only used in the laboratory, and can not be used in the mass production of heat pipes.

In mass production of heat pipes, a large number of performance tests are needed, and the apparatus is used frequently over a long period of time; therefore, the apparatus not only requires good testing accuracy, but also requires easy and accurate assembly to the heat pipes to be tested. The testing apparatus affects the yield and cost of the heat pipes directly; therefore, testing accuracy, facility, speed, consistency, reproducibility and reliability need to be considered when choosing the testing apparatus. Therefore, the testing apparatus needs to be improved in order to meet the demand for mass production of heat pipes.

What is needed, therefore, is a high performance testing apparatus for heat pipes suitable for use in mass production of heat pipes.

SUMMARY OF THE INVENTION

A performance testing apparatus for a heat pipe in accordance with a preferred embodiment of the present invention comprises an immovable portion having a heating member located therein for heating an evaporating section of a heat pipe requiring testing. A movable portion is capable of moving relative to the immovable portion. A receiving structure is defined between the immovable portion and the movable portion for receiving the evaporating section of the heat pipe therein. At least one temperature sensor is attached to at least one of the immovable portion and the movable portion. The at least one temperature sensor has a portion thereof exposed in the receiving structure for thermally contacting the evaporating section of the heat pipe in the receiving structure to detect a temperature of the heat pipe. The movable portion is driven by a driving device such as a step motor to move towards or away from the immovable portion. A spring coil is compressed to exert a force on the at least one temperature sensor towards the evaporating section of the heat pipe so that a detecting section of the temperature sensor can have an intimate contact with the evaporating section of the heat pipe.

Other advantages and novel features will become more apparent from the following detailed description of preferred embodiments when taken in conjunction with the accompanying drawings, in which:

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
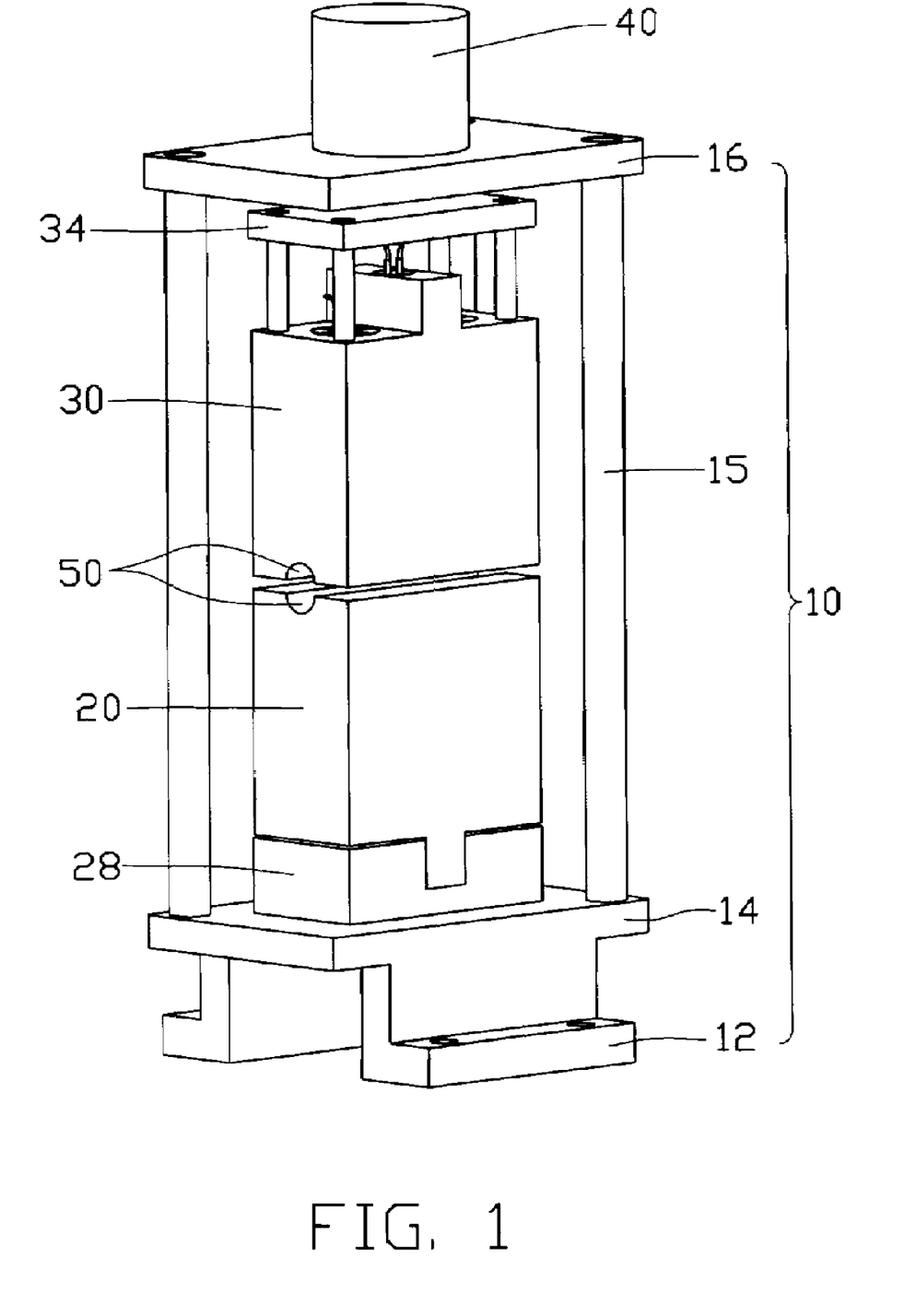
FIG. 1 is an assembled view of a performance testing apparatus for heat pipes in accordance with a preferred embodiment of the present invention.
Figure 2:
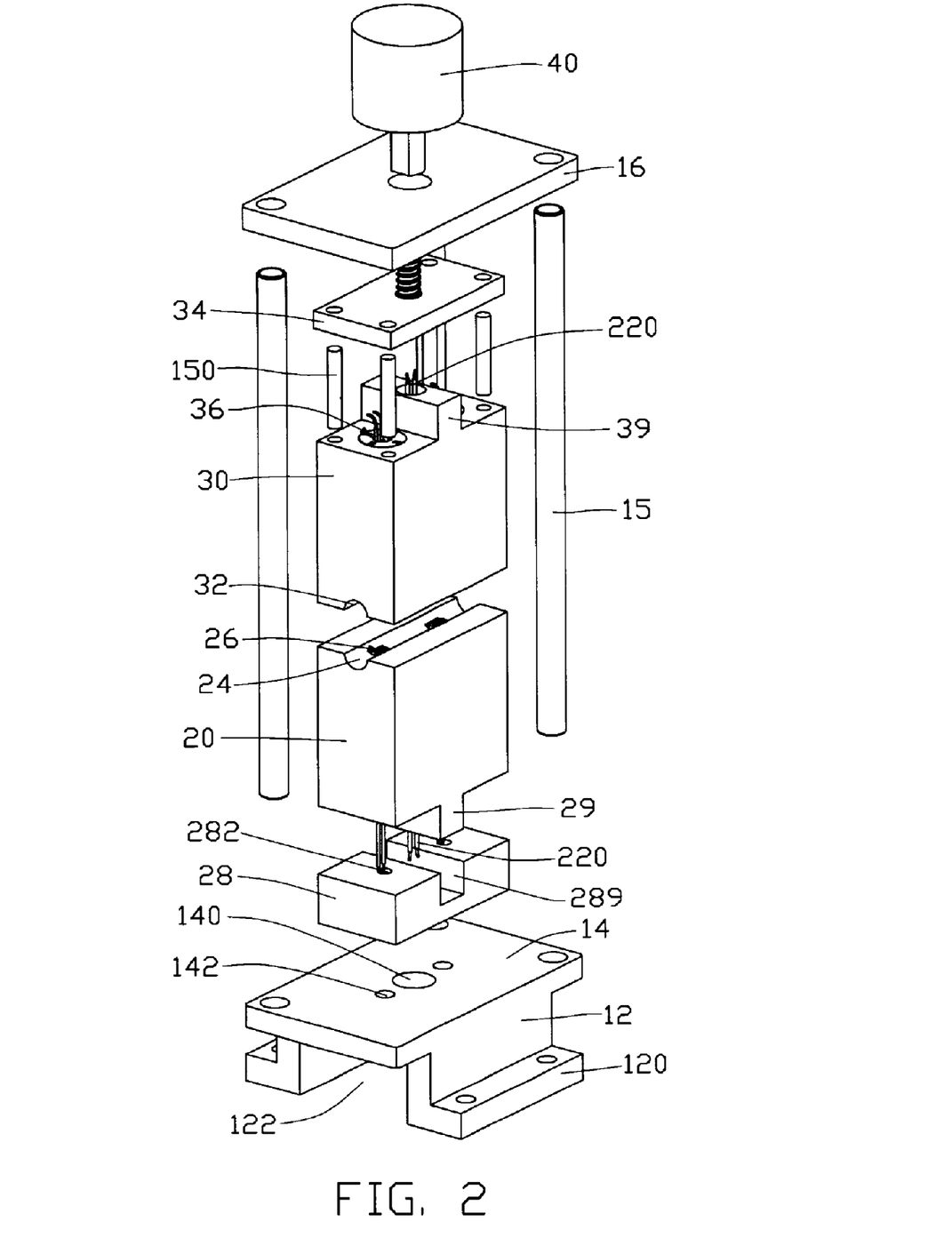
FIG. 2 is an exploded, isometric view of the testing apparatus of FIG. 1.

Referring to FIGS. 1 and 2, a performance testing apparatus for heat pipes comprises an immovable portion 20 and a movable portion 30 movably mounted on the immovable portion 20. The performance testing apparatus is to be held on a platform of a supporting member such as a testing table or so on.

Figure 3A:
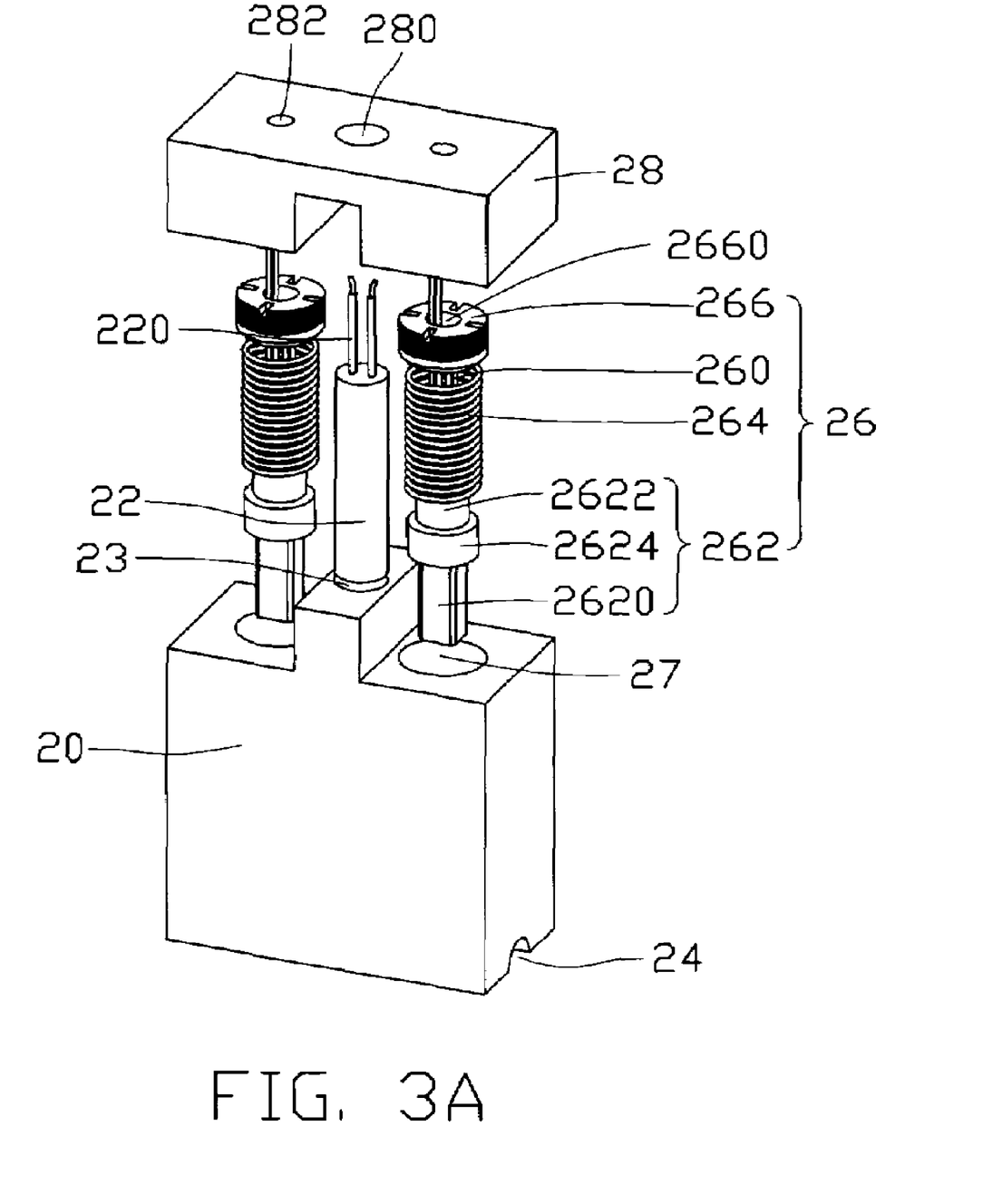
FIG. 3A shows an immovable portion and two temperature sensors of the testing apparatus of FIG. 2, viewed from another aspect.
Figure 3B:
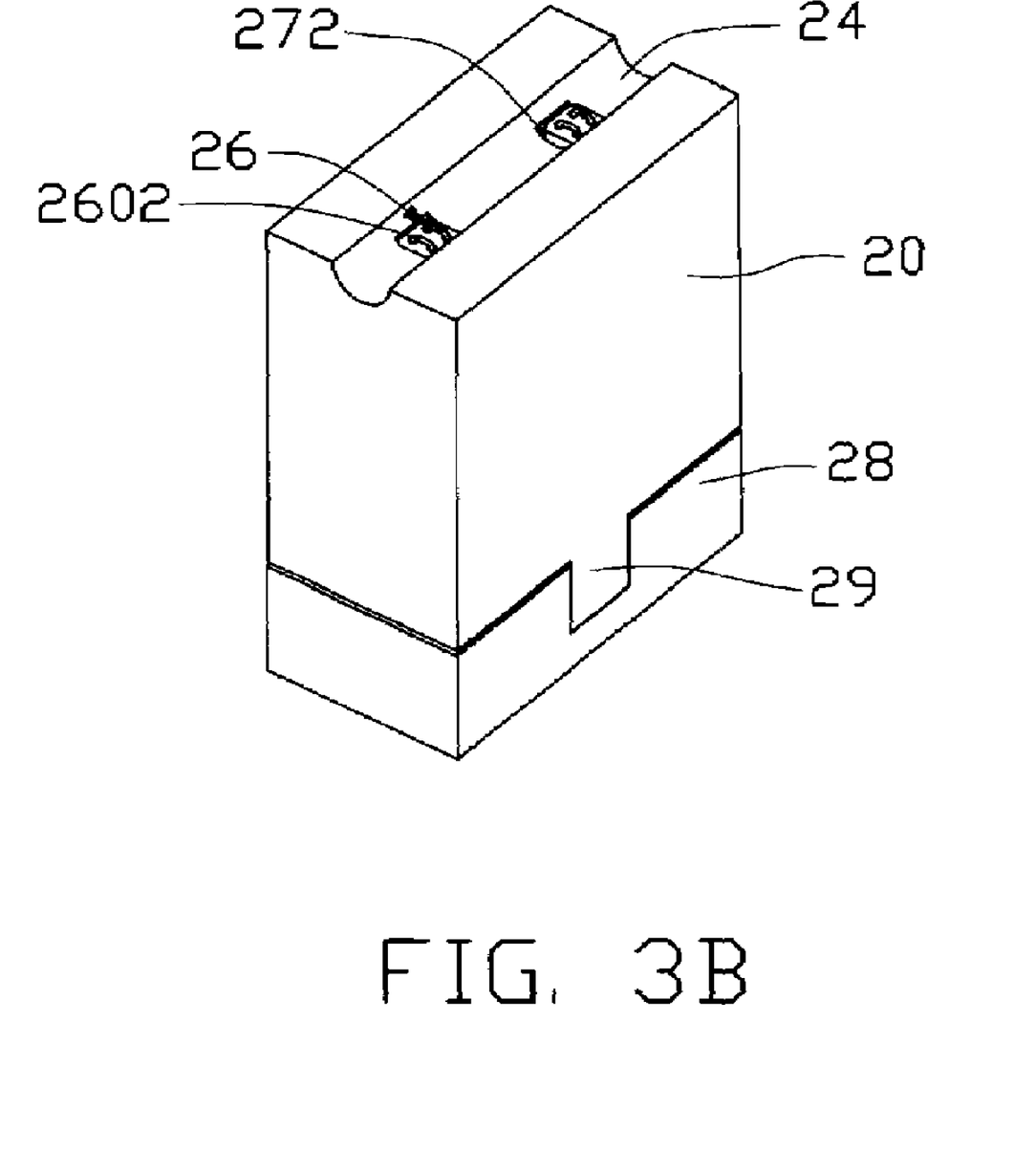
FIG. 3B is an assembled view of FIG. 3A, viewed from another aspect.

Referring also to FIGS. 3A and 3B, the immovable portion 20 is made of material having good heat conductivity. A first heating member 22 such as an immersion heater, resistance coil, quartz tube and Positive temperature coefficient (PTC) material or the like is embedded in the immovable portion 20. The immovable portion 20 has a central portion thereof extending an extension 29 downwardly. The immovable portion 20 defines a hole 23 in the extension 29. In this case, the first heating member 22 is an elongated cylinder. The first heating member 22 is accommodated in the hole 23 of the immovable portion 20. Two spaced wires 220 extend beyond the extension 29 from a bottom end of the heating member 22 for connecting with a power supply (not shown). The immovable portion 20 has a heating groove 24 defined in a top face thereof, for receiving an evaporating section of the heat pipe to be tested therein. Two temperature sensors 26 are inserted into the immovable portion 20 from a bottom thereof so as to position detecting sections 2602 of the sensors 26 in the heating groove 24. The detecting sections 2602 are capable of automatically contacting the heat pipe in order to detect a temperature of the evaporating section of the heat pipe.

Figure 4A:
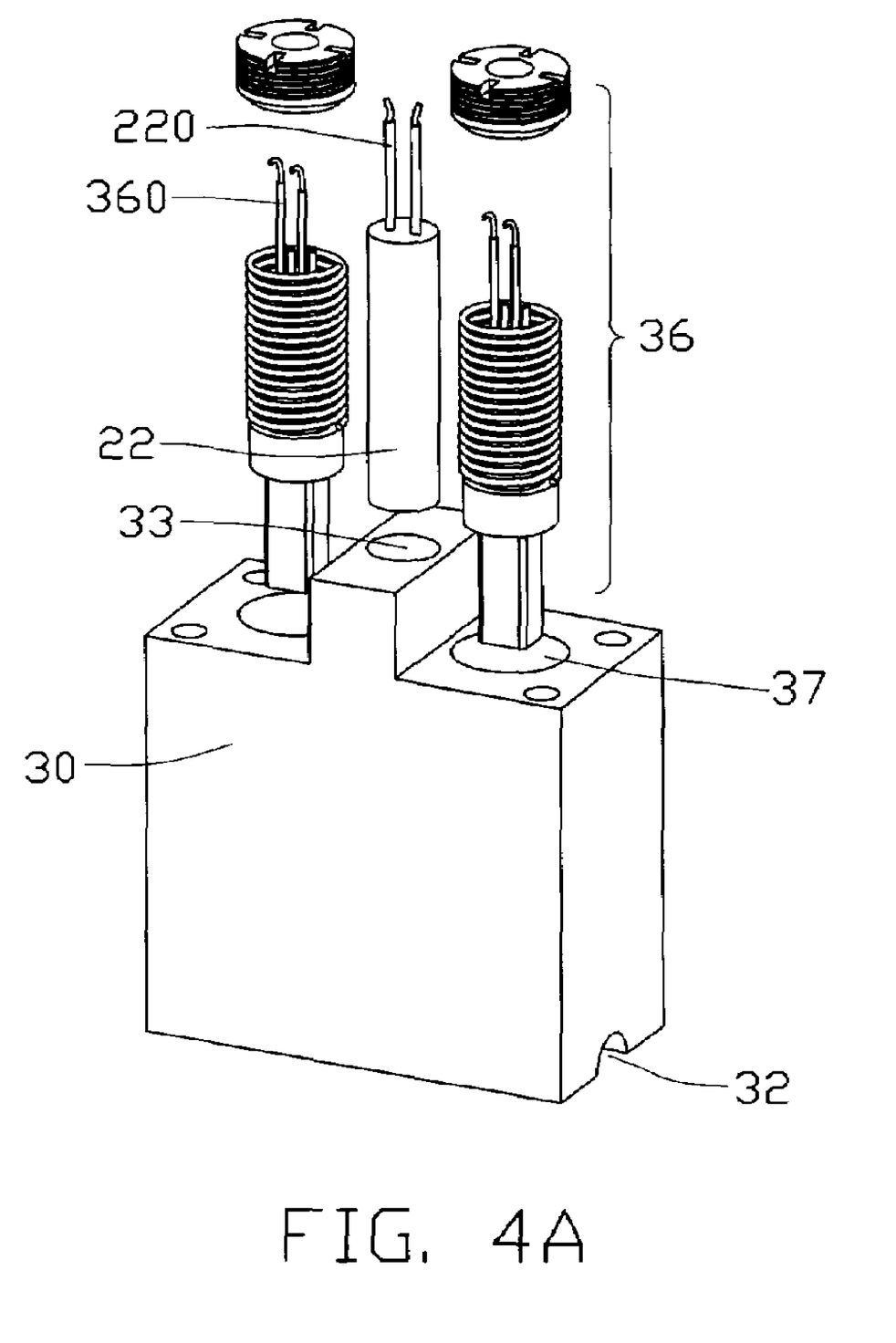
FIG. 4A shows a movable portion and two temperature sensors of the testing apparatus of FIG. 2, viewed from another aspect.
Figure 4B:
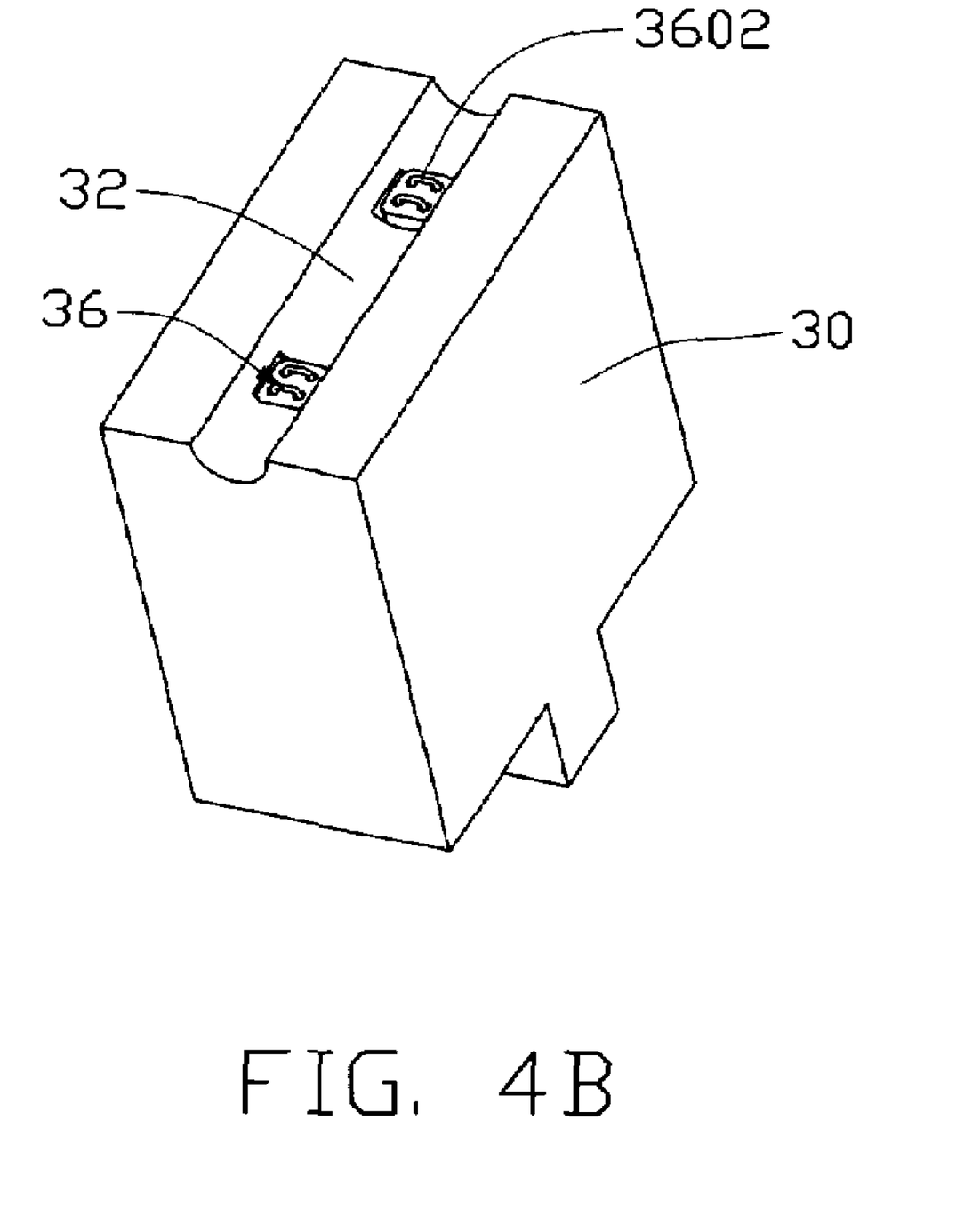
FIG. 4B is an assembled view of FIG. 4A, viewed from another aspect.

Referring also to FIGS. 4A and 4B, the movable portion 30 is also made of material having good heat conductivity. The movable portion 30 has an extension 39 extending upwardly from a middle of a top surface thereof. The movable portion 30 defines a hole 33 in the extension 39. A second heating member 22 is accommodated in the hole 33 of the movable portion 30. Two spaced wires 220 extend from a top end of the heating member 22 beyond the extension 39 for connecting with the power supply (not shown). The movable portion 30, corresponding to the heating groove 24 of the immovable portion 20, has a heating groove 32 defined therein, whereby a testing channel 50 is cooperatively defined by the heating grooves 24, 32 when the movable portion 30 moves to reach the immovable portion 20. Thus, an intimate contact between the heat pipe and the movable and immovable portions 30, 20 defining the channel 50 can be realized, thereby reducing heat resistance between the heat pipe and the movable and immovable portions 30, 20. Two temperature sensors 36 are inserted into the movable portion 30 from a top thereof to reach a position wherein detecting sections 3602 of the sensors 36 are located in the groove 32. The detecting sections 3602 are capable of automatically contacting the heat pipe to detect the temperature of the evaporating section of the heat pipe. A board 34 is positioned over the movable portion 30. Four columns 150 are secured at corresponding four corners of the movable portion 30 and extend upwardly to engage in corresponding four through holes (not labeled) defined in four corners of the board 34. A space (not labeled) is left between the extension 39 and the board 34 for extension of the wires 220 of the heating member 22 to connect with the power supply.

The channel 50 as shown in the preferred embodiment has a circular cross section enabling it to receive the evaporating section of the heat pipe having a correspondingly circular cross section. Alternatively, the channel 50 can have a rectangular cross section where the evaporating section of the heat pipe also has a flat rectangular configuration.

In order to ensure that the heat pipe is in close contact with the movable and immovable portions 30, 20, a supporting frame 10 is used to support and assemble the immovable and movable portions 20, 30. The immovable portion 20 is fixed on the supporting frame 10. A driving device 40 is installed on the supporting frame 10 to drive the movable portion 30 to make accurate linear movement relative to the immovable portion 20 along a vertical direction, thereby realizing the intimate contact between the heat pipe and the movable and immovable portions 30, 20. In this manner, heat resistance between the evaporating section of the heat pipe and the movable and immovable portions 30, 20 can be minimized.

The supporting frame 10 comprises a seat 12. The seat 12 comprises a first plate 14 at a top thereof and two feet 120 depending from the first plate 14. A space 122 is defined between the two feet 120 for extension of the wires 220 and wires 260 of the temperature sensors 26. The supporting frame 10 has a second plate 16 hovering over the first plate 14. Pluralities of supporting rods 15 interconnect the first and second plates 14, 16 for supporting the second plate 16 above the first plate 14. The seat 12, the second plate 16 and the rods 15 constitute the supporting frame 10 for assembling and positioning the immovable and movable portions 20, 30 therein. The immovable portion 20 is fixed on the first plate 14. In order to prevent heat in the immovable portion 20 from spreading to the first plate 14, an insulating plate 28 is located at the bottom of the immovable portion 20. The insulating plate 28, corresponding to the extension 29 of the immovable portion 20, defines a concave 289 receiving the extension 29 therein. The first plate 14 and the insulating plate 28 define corresponding through holes 140, 280 for the wires 220 of the heat member 22 of the immovable portion 20 to extend therethrough, and spaced apertures 142, 282 to allow the wires 260 of the temperature sensors 26 to extend therethrough. The wires 260 are to connect with a monitoring computer (not shown).

The driving device 40 in this preferred embodiment is a step motor, although it can be easily apprehended by those skilled in the art that the driving device 40 can also be a pneumatic cylinder or a hydraulic cylinder. The driving device 40 is installed on the second plate 16 of the supporting frame 10. The driving device 40 is fixed to the second plate 16 above the movable portion 30. A shaft (not labeled) of the driving device 40 extends through the second plate 16 of the supporting frame 10. The shaft has a threaded end (not shown) threadedly engaging with a bolt 42 secured to the board 34 of the movable portion 30. When the shaft rotates, the bolt 42 with the board 34 and the movable portion 30 move upwardly or downwardly. In use, the driving device 40 accurately drives the movable portion 30 to move linearly relative to the immovable portion 20. For example, the movable portion 30 can be driven to depart a certain distance such as 5 millimeters from the immovable portion 20 to facilitate the insertion of the evaporating section of the heat pipe being tested into the channel 50 or withdrawn from the channel 50 after the heat pipe has been tested. On the other hand, the movable portion 30 can be driven to move toward the immovable portion 20 to thereby realize an intimate contact between the evaporating section of the heat pipe and the immovable and movable portions 20, 30 during the test. Accordingly, the requirements for testing, i.e. accuracy, ease of use and speed, can be realized by the testing apparatus in accordance with the present invention.

It can be understood, positions of the immovable portion 20 and the movable portion 30 can be exchanged, i.e., the movable portion 30 is located on the first plate 14 of the supporting frame 10, and the immovable portion 20 is fixed to the second plate 16 of the supporting frame 10, and the driving device 40 is positioned to be adjacent to the movable portion 20. Alternatively, the driving device 40 can be installed to the immovable portion 20. In addition, each of the immovable and movable portions 20, 30 may have one driving device 40 installed thereon to move them toward/away from each other.

Referring to FIGS. 3A and 3B again, the immovable portion 20 having two through holes 27 communicating with the heating groove 24 are defined at two opposite sides of the heating member 22. Each of the two temperature sensors 26 comprises a positioning socket 262 and a pair of thermocouple wires 260 fitted in the socket 262. The socket 262 comprises a square column 2620, a circular column 2622 below the square column 2620, and a circular collar 2624 between the square column 2620 and the circular column 2622. The socket 262 has two pairs of through apertures (not shown) extending from a top of the square column 2620 to a bottom of the circular column 2622. A spring coil 264 surrounds the circular column 2622 of the socket 262. Each wire 260 has two vertical sections (not labeled) extending into the apertures and the detecting section 2602 located between the two vertical sections thereof. The detecting sections 2602 are located at the top of the square column 2620 and separated from each other. The vertical sections are each secured in a corresponding aperture. The through hole 27 has a square portion 272 adjacent to the groove 24 to thereby ensure the square column 2620 to be fitted therein, and a round portion (not labeled) below the square portion 272 to ensure the collar 2624 and the spring coil 264 to be fitted therein. When the collar 2624 abuts against a bottom of the square portion 272, the circular column 2622 and the spring coil 264 are received in the through hole 27. The spring coil 264 is compressed by a screw 266 engaged in the hole 27 of the immovable portion 20. The hole 27 has a thread (not shown) in a bottom of an inner face thereof. The screw 266 has a thread in a periphery face thereof and a through opening 2660 extending through a center thereof. The bottom ends of the wires 260 extend through the opening 2660 of the screw 266 to connect with the monitoring computer. The screw 266 engages in the hole 27 thereby pushing the spring coil 264 together with the temperature sensor 26 towards the groove 24 of the immovable portion 20.

According to the preferred embodiment, the temperature sensor 26 is positioned on the hole 27 of the immovable portion 20 via the screw 266 engaging in the hole 27. Therefore, 1) it is easy to install/remove the temperature sensor 26 to/from the immovable portion 20; and, 2) it is easy to adjust the compression force of the spring coils 364 to thereby provide suitable force on the detecting sections 2602 of the wires 260, whereby the detecting sections 2602 can have an optimal contact with the evaporating section of heat pipe.

Referring to FIGS. 4A and 4B again, the temperature sensors 36 and the movable portion 30 have configuration and relationship similar to that of the temperature sensors 26 and the immovable portion 20 as illustrated in FIGS. 3A and 3B. The wires 360 of the two temperature sensors 36 each comprise the detecting section 3602 located between two vertical sections (not labeled) thereof; a receiving hole 37 of the movable portion 30 identical to the hole 27 of the immovable portion 20, receives the temperature sensor 36 therein.

In use, the evaporating section of the heat pipe is received in the channel 50 when the movable portion 30 moves away from the immovable portion 20. The evaporating section of the heat pipe is put in the heating groove 24 of the immovable portion 20. Then the movable portion 30 moves to reach the immovable portion 20 so that the evaporating section of the heat pipe is tightly fitted into the channel 50. The sensors 26, 36 are in thermal contact with the evaporating section of the heat pipe; therefore, the sensors 26, 36 work to accurately send detected temperatures from the evaporating section of the heat pipe to the monitoring computer. Based on the temperatures obtained by the plurality of sensors 26, 36, an average temperature can be obtained by the monitoring computer very quickly; therefore, performance of the heat pipe can be quickly decided.

In the preferred embodiment of the present invention, the wires 260 are perpendicular to the groove 24; however, they can be oriented with other angles in respective to the groove 24, so long as the wires 260 have an intimate contact with the evaporating section of the heat pipe when the movable portion 30 moves toward the immovable portion 20.

Additionally, in the present invention, in order to lower cost of the testing apparatus, the insulating plate 28, the board 34 and the positioning socket 262 can be made from low-cost material such as PE (Polyethylene), ABS (Acrylonitrile Butadiene Styrene), PF (Phenol-Formaldehyde), PTFE (Polytetrafluoroethylene) and so on. The immovable portion 20 and movable portion 30 can be made from copper (Cu) or aluminum (Al). The immovable portion 20 and movable portion 30 can have silver (Ag) or nickel (Ni) plated on an inner face defining the grooves 24, 32 to prevent the oxidization of the inner face.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A performance testing apparatus for a heat pipe comprising:
   an immovable portion having a first heating member located therein for heating an evaporating section of the heat pipe;

a movable portion capable of moving relative to the immovable portion and having a second heating member located therein for heating the evaporating section of the heat pipe;

a receiving structure being defined between the immovable portion and the movable portion for receiving the evaporating section of the heat pipe therein; and at least one temperature sensor being attached to at least one of the immovable portion and the movable portion for thermally contacting the evaporating section of heat pipe in the receiving structure for detecting temperature of the evaporating section of the heat pipe.

2. The testing apparatus of claim 1, wherein the receiving structure is a channel defined between the immovable portion and the movable portion.

3. The testing apparatus of claim 2, wherein the at least one temperature sensor has a detecting section thereof exposed to the channel.

4. The testing apparatus of claim 3, wherein the at least one of the immovable portion and the movable portion has at least one positioning structure communicating with the channel, the at least one temperature sensor being positioned in the at least one positioning structure.

5. The testing apparatus of claim 4, wherein the at least one temperature sensor comprises two wires, each of the two wires comprising first and second sections and the detecting section being located between the first and second sections.

6. The testing apparatus of claim 5, wherein the at least one temperature sensor is positioned in a positioning socket movably fitted in a through hole of the positioning structure of the at least one of the immovable portion and the movable portion, the first and second sections of the each of the two wires of each temperature sensor being received in the socket, an end of the second section extending away from the socket for connecting with a monitoring computer, the detecting section being located at a top of the positioning socket for contacting with the heat pipe.

7. The testing apparatus of claim 6, wherein the positioning socket comprises a square column, a circular column and a circular collar between the square and circular columns, and wherein the through hole of the positioning structure has square and circular sections corresponding to the square column and the circular column of the socket, respectively.

8. The testing apparatus of claim 7, wherein the positioning socket has a spring coil surrounding the circular column of the socket and movably received in the through hole of the positioning portion.

9. The testing apparatus of claim 8, wherein the at least one temperature sensor is secured in the through hole of the positioning structure via a screw engaged in the through hole, the ends of the wires of the at least one temperature sensor extending through the screw.

10. The testing apparatus of claim 1, wherein the first heating member is accommodated in a hole defined in the immovable portion, and extends two wires to connect with a power supplier.

11. The testing apparatus of claim 10, wherein the immovable portion further extends an extension, the hole being defined in the extension, the two wires of the heating member extending beyond the extension.

12. The testing apparatus of claim 1, wherein the second heating member is accommodated in a hole defined in the movable portion, and extends two wires to connect with a power supplier.

13. The testing apparatus of claim 12, wherein the movable portion further extends an extension, the hole being defined in the extension, the two wires of the second heating member extending beyond the extension.

* * * * *

UNITED STATES PATENT AND TRADEMARK OFFICE
CERTIFICATE OF CORRECTION

PATENT NO. : 7,530,736 B2
APPLICATION NO. : 11/309289
DATED : May 12, 2009
INVENTOR(S) : Tay-Jian Liu et al.

Page 1 of 1

It is certified that error appears in the above-identified patent and that said Letters Patent is hereby corrected as shown below:

Please replace Section (73) regarding "Assignees" on the front page of the Patent with the following:

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

Signed and Sealed this

Twenty-first Day of July, 2009

JOHN DOLL
*Acting Director of the United States Patent and Trademark Office*